Dec. 8, 1964    H. R. HUDSON ETAL    3,160,040
MODULATED FEED FOR ENGINE LATHES
Filed July 31, 1961    5 Sheets-Sheet 1
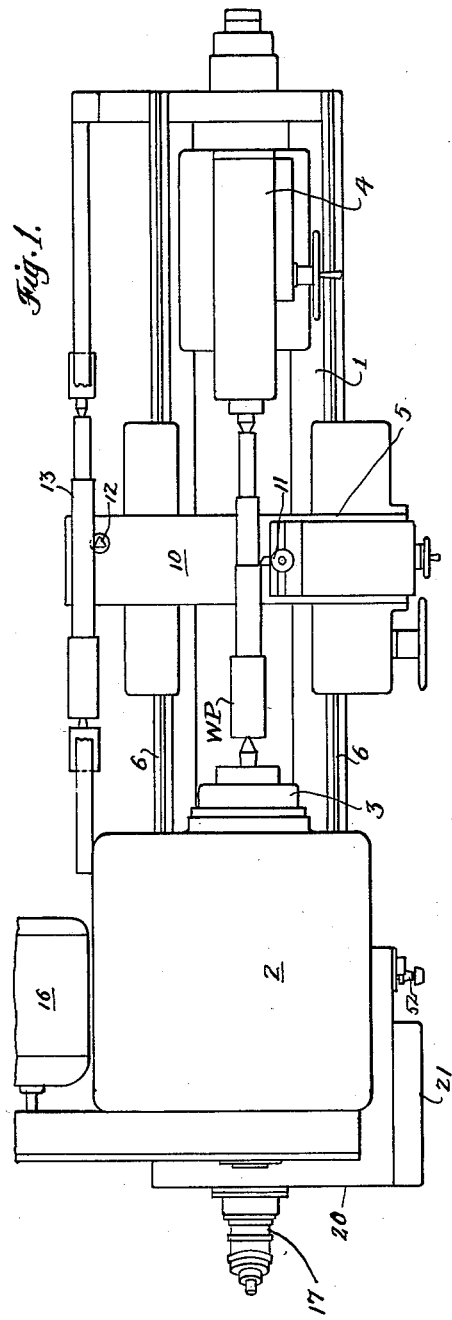
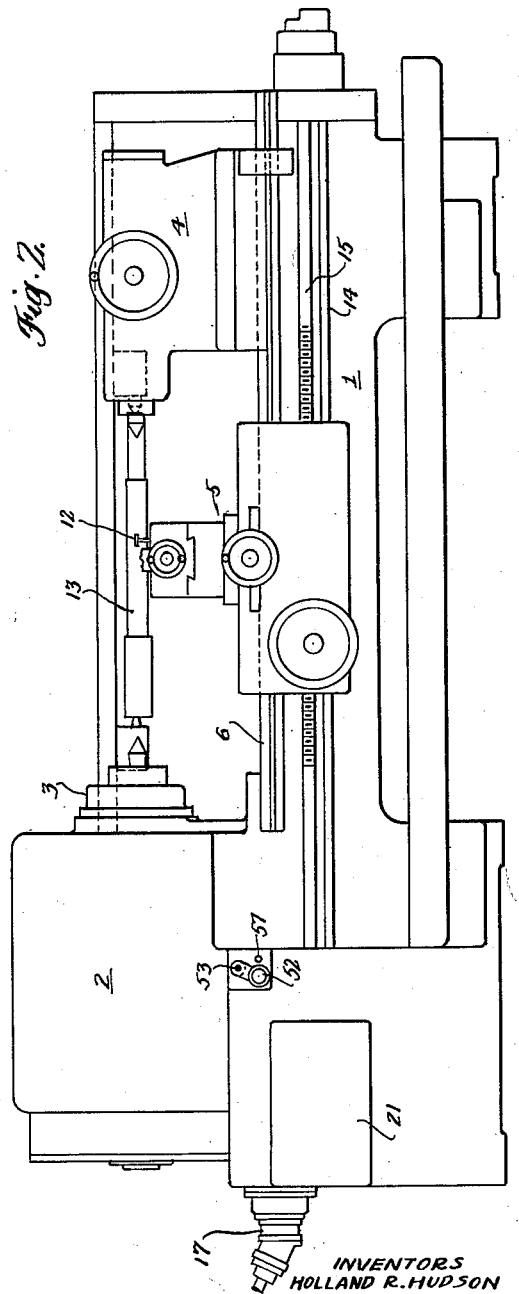
INVENTORS
HOLLAND R. HUDSON
ARTHUR C. NOLTE
JAMES N. COLEBROOK
BY
Synnestvedt & Lechner
ATTORNEYS

INVENTORS
HOLLAND R. HUDSON
ARTHUR C. NOLTE
JAMES N. COLEBROOK

BY
Synnestvedt & Lechner
ATTORNEYS

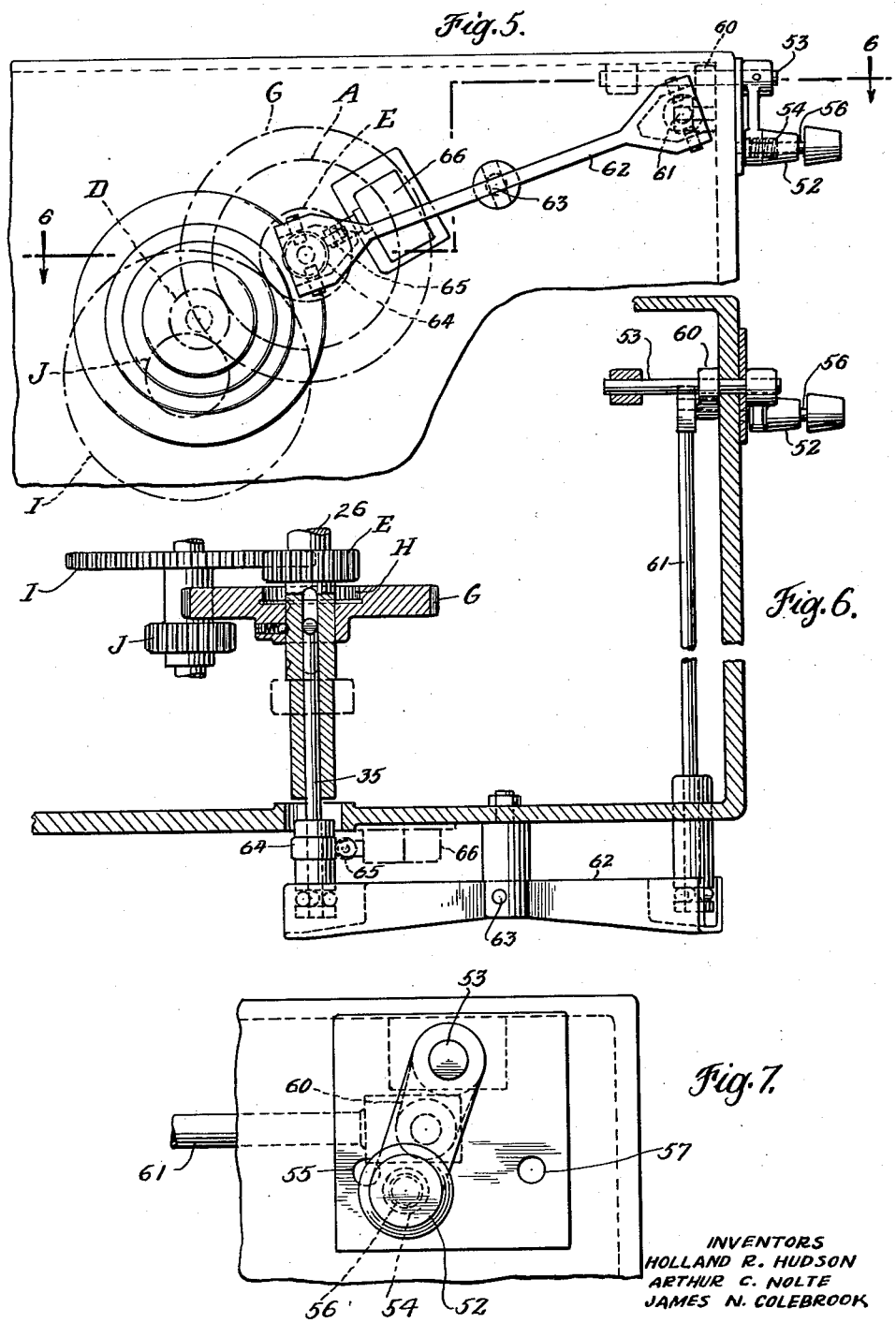

Dec. 8, 1964    H. R. HUDSON ETAL    3,160,040
MODULATED FEED FOR ENGINE LATHES
Filed July 31, 1961    5 Sheets-Sheet 4

INVENTORS
HOLLAND R. HUDSON
ARTHUR C. NOLTE
JAMES N. COLEBROOK
BY
Synnestvedt & Lechner
ATTORNEYS Dec. 8, 1964
H. R. HUDSON ETAL
3,160,040
MODULATED FEED FOR ENGINE LATHES
Filed July 31, 1961
5 Sheets-Sheet 5
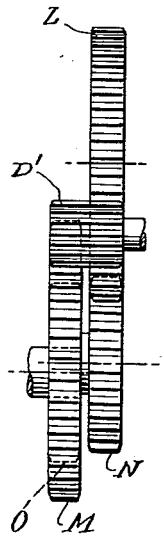
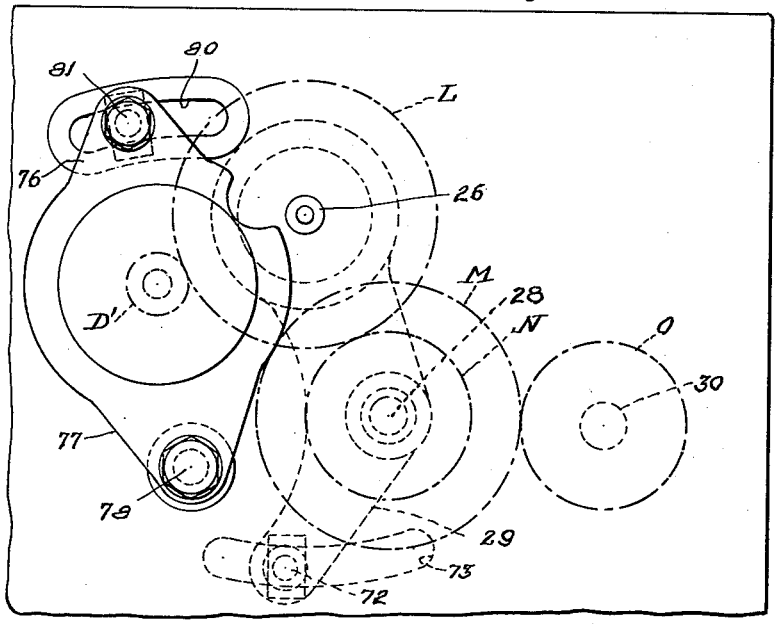
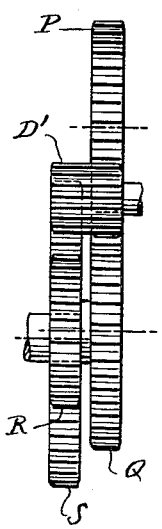
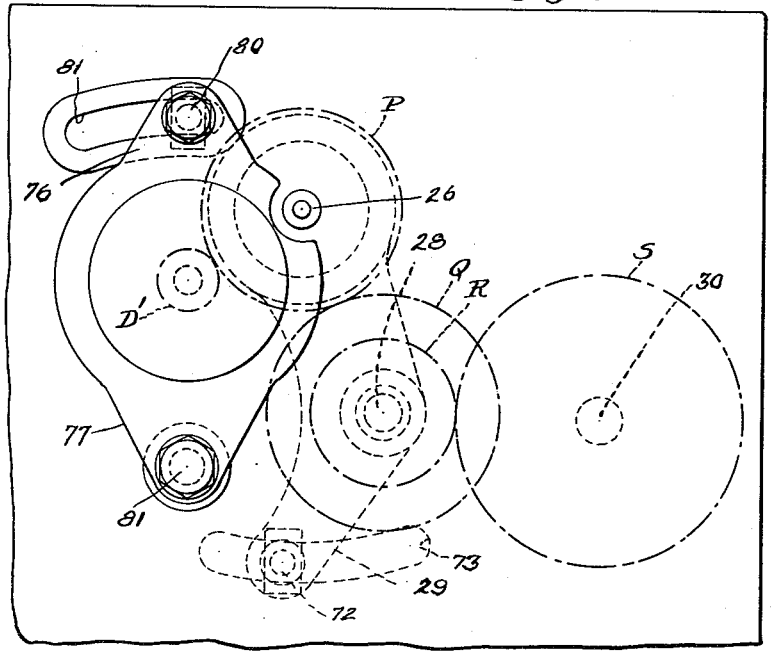
INVENTORS
HOLLAND R. HUDSON
ARTHUR C. NOLTE
JAMES N. COLEBROOK
BY
ATTORNEYS

United States Patent Office 3,160,040
Patented Dec. 8, 1964

3,160,040
MODULATED FEED FOR ENGINE LATHES
Holland R. Hudson, 8844 Long Lane, Cincinnati, Ohio;
Arthur C. Nolte, 10430 Twinkle Lane, Cincinnati, Ohio;
and James N. Colebrook, Cincinnati, Ohio; said Colebrook assignor to The Lodge & Shipley Company, Cincinnati, Ohio, a corporation of Ohio
Filed July 31, 1961, Ser. No. 128,006
11 Claims. (Cl. 82—21)

This invention in general relates to lathes, and in particular, relates to engine lathes wherein the carriage is arranged for conventional or tracer modulated feed.

The invention contemplates integrating the modulated drive control, particularly the motor, into the lathe in a manner to make the translating gearing and the quick change gearing available both for conventional feed and for modulated feed. According to the invention, the normal versatility of the engine lathe is preserved, and in addition its versatility and usefulness in modulated feed is extended.

The invention will be described in connection with the following drawings wherein:

FIGURE 1 is a plan view of a typical engine lathe;

FIGURE 2 is an elevational view of the lathe of FIGURE 1;

FIGURE 5 is a fragmentary elevation of a control mechanism used in set up of the lathe for conventional or modulated feed;

FIGURE 6 is a fragmentary plan section taken along the line 6—6 of FIGURE 5;

FIGURE 7 is a fragmentary elevational view of a portion of the control mechanism of FIGURES 5 and 6;

FIGURE 11 is an elevational view illustrating how the mounting arrangement of FIGURE 8 for the modulated feed motor provides for changing the speed ratio of the translating gears, in the view the gears effect a step-up transmission;

FIGURE 12 is an end view of the translating gears of FIGURE 11;

FIGURE 13 is an elevational view illustrating how the mounting arrangement of FIGURE 8 for the modulated feed motor further provides for changing the speed ratio of the translating gears, in the view the gears effect a step-down transmission; and FIGURE 14 is an end view of the translating gears of FIGURE 13.

Figure 3:
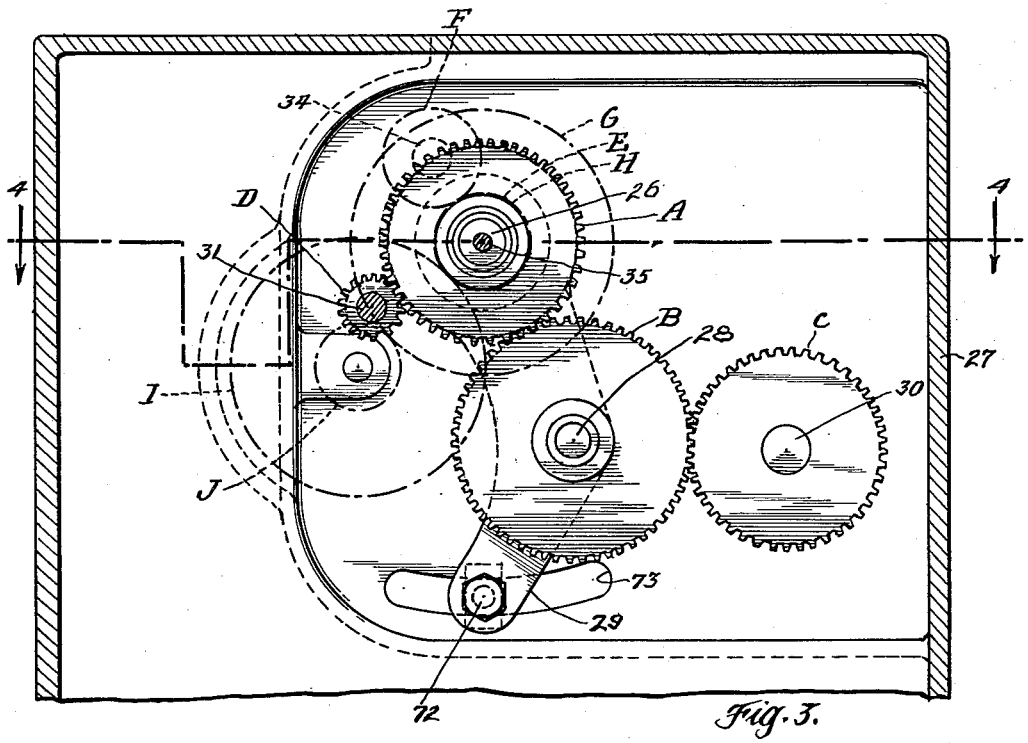
FIGURE 3 is a fragmentary sectional view showing the portion of the headstock of the lathe of FIGURE 1 where the translating gears and the modulated feed drive motor are mounted, the view being taken along the line 3—3 of FIGURE 4.

FIGURES 1 and 2 illustrate a typical engine lathe, on the bed 1 of which is a headstock 2 rotatably mounting a spindle 3. The tailstock 4 is mounted on a bed for movement toward and away from the headstock. A typical workpiece WP is mounted between the live centers of the spindle and tailstock. The carriage 5 is mounted on the ways 6 of the bed for movement toward and away from the headstock. The carriage has a cross slide 10 which mounts a tool 11. The slide 10 is mounted on the carriage for reciprocating motion at 90° to the axis of the workpiece WP. The slide motion is controlled by a tracer system, the valve of which is connected with the slide 10. The valve stylus indicated at 12 cooperates with the template 13.

The carriage is adapted to be moved by way of the feed rod 14 (FIGURE 2) for tracer operation and moved by the lead screw 15 for thread chasing.

As is customary in an engine lathe, the spindle is driven through a speed change gearing arrangement, the driving power being supplied by a motor such as the motor 16. The spindle drive mechanism is used to power the carriage feed mechanism. For this purpose the headstock gearing is interconnected with a set of translating gears (housed at the section indicated at 20), the translating gears in turn supplying the input to the quick-change gear box (located in the area indicated at 21), with the output of the quick-change gear box being connected via clutches to the feed rod 14 and the lead screw 15.

Ordinarily the lead screw on an engine lathe is an English screw set up to obtain the standard range of threads, leads, and feeds. In this regard, the translating gears are usually replaceable and also capable of being compounded so that special translating gears can be substituted to obtain metric leads and feeds with an English screw or odd threads or other special ranges of threads, leads, and feeds.

The typical engine lathe is an important industrial tool which is capable of forming various types of threads and also capable of performing a variety of machining operations such as turning, boring, facing, and the like. It will be understood, therefore, that preserving the usefulness and adaptability of the engine lathe is an important consideration.

In some types of machining operations, it is highly desirable to maintain a constant tool feed, that is to say for any given unit of time, the tool moves over the workpiece the same finite distance. In contouring work with constant carriage feed the maintaining of constant tool feed is impossible particularly where the cross slide must rapidly move the tool (in or out) in order to maintain the required profile. For constant tool feed, the art in recent years has adopted so-called modulated carriage feed, i.e., the speed or feed of the carriage is made variable as a function of 90° tool motion. Ordinarily this is accomplished by a special tracer valve which controls the motion of the 90° cross slide and also controls the rotation of a hydraulic motor which in turn is connected to drive the carriage feed rod.

Modulated feed has been applied to conventional engine lathes by connecting the modulated feed motor directly to the carriage feed rod, the connection being made at the tailstock end of the lathe. The conventional arrangement is satisfactory from the standpoint of modulated feed per se, but has a very undesirable defect in that the versatility and usefulness of the lathe for modulated feed operation is highly restricted, particularly from the standpoint of the variety of feed ranges which is very important in modern day contouring operations.

With this in mind then, the invention contemplates integrating the modulated feed into the engine lathe in a manner which not only preserves the usual and important functions of the lathe, but extends the versatility of the same under modulated feed drive particularly from the standpoint of variety of feed ranges, reliability and simplicity of operation.

For incorporating the modulated feed motor (indicated at 17 in FIGURES 1 and 2) into the engine lathe, we have provided a headstock clutch arrangement between the translating gears and the spindle drive mechanism, the clutching arrangement preferably being in the form of a gear box which has a neutral and two settable positions. In the neutral position the drive connection between the spindle gearing and the translating gears is broken so that the modulated feed motor powers the carriage. In either settable position the carriage is powered in the conventional manner, i.e., by the spindle drive mechanism.

The modulated feed fluid motor is connected to the input of the translating gears via a pinion and electrically operated clutch. Interlock means are provided so that it is only when the headstock clutch is set in the neutral position that the electric clutch for the fluid motor can drivingly connect the motor and the pinion and only when the headstock clutch is moved into the either settable position, that the spindle drive mechanism can power the carriage. The shifting of the headstock clutch and the energizing or de-energizing of the fluid motor clutch is controlled from a single lever on the front of the machine which can be easily manipulated by the operator.

It will be apparent, therefore, that switching the lathe from conventional to modulated feed or vice versa is a relatively simple process and the interlock which is operative on change of set-up insures that either the modulated feed motor or the spindle drive mechanism supplies the power to drive the carriage and that both cannot supply power at the same time.

The preferred form of the invention contemplates that the modulated feed motor be connected with the input gear of the translating set and that the fluid motor be mounted so as to be movable toward and away from the translating gears. In the outward position the motor pinion offers little or no interference to the changing and compounding of the translating gears. The compounding of the translating gears may be for the usual purpose, i.e., converting from one dimensional system to another, for example, from English to metric. In the present arrangement, however, it is contemplated that compounding be effected for use of the lathe in modulated feed. The compounding (for either increase or decrease in speed) enables a much wider variety of carriage feed ranges. The advantage of this is readily appreciated since the translating gears supply the input to the quick-change gear box, which in the usual instances, permits 25 to 30 changes within the particular input range.

From the foregoing, it will be seen that the invention provides for an extremely wide variety of carriage feeds. This variety being provided by the speed range of the fluid motor itself, the changing or compounding of the translating gears and the quick-change gear box.

The foregoing has several important advantages, the principal advantage being that the variety of feed ranges provides satisfaction of the long felt need of machining or cutting under tracer control with the optimum tool feed for the particular contour, type of material, surface finish and the like, and additionally, even under such desired conditions the modulated feed motor can be operated within its most favorable speed range. Thus there is gained a highly desired operational coordination between the tool and its power source while still retaining the basic nature and advantages of the engine lathe.

We will now discuss the various structural aspects of the invention illustrating how the same are preferably applied to an engine lathe.

Referring to FIGURE 3 the translating gears for a typical engine lathe are indicated at A, B, and C. The gear A, which is the input gear, is driven by the spindle drive mechanism or the modulated feed motor. The gear A is mounted on a shaft 26 suitably disposed in bearings in the headstock frame 27. The gear B is mounted on a shaft 28 on the quadrant 29. The gear C, which is the output gear, is mounted on a shaft 30 which connects the gear to the input of the quick-change gear box. As shown, the gears A and C have the same number of teeth so that the speed ratio as between input and output is 1 to 1. A pinion D meshes with the gear A, the pinion being mounted on shaft 31 which is interconnected to the fluid motor 17 (see FIGURE 4). The motor 17 is mounted on a support or casing 32 connected with the cover 33 secured to the frame 27.

Figure 4:
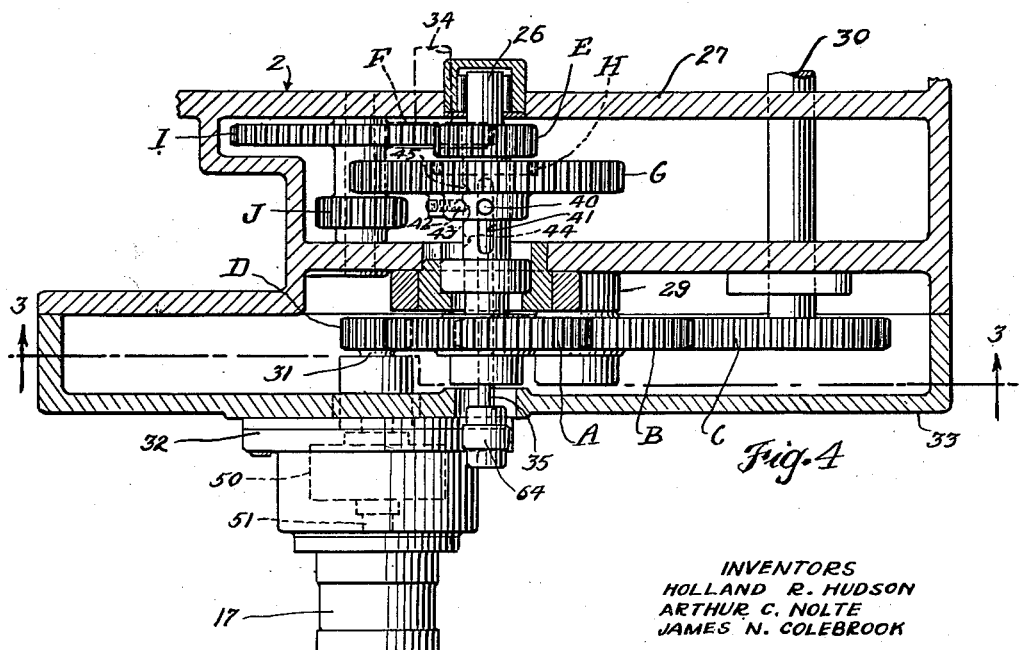
FIGURE 4 is a plan sectional view taken along the line 4—4 of FIGURE 3.

The shaft 26 and the input gear A are adapted to be driven by the spindle drive mechanism as explained following. With reference to FIGURE 4 the shaft 26 carries a gear E which is freely rotatable on the shaft. The gear E is in mesh with a gear F mounted on a shaft 34. The shaft 34 is connected to the spindle drive mechanism within the headstock and is rotated thereby. Rotation of the shaft 34 causes rotation of the gear F and hence rotation of the gear E.

As mentioned heretofore, the invention contemplates a clutch arrangement in the form of a speed change gear box which is operative to connect or disconnect the spindle drive with the translating gears. This arrangement includes a gear G and an internal gear H, together with a pair of idler gears I and J. The gear I is in mesh with the gear E so as to partake of the same rotation.

The gear G is splined to the shaft 26 so as to be axially shiftable thereon, the shifting being effected by a rod 35 internally mounted within the shaft 26 and having a pin 40 connected to the gear G. The slot 41 accommodates the shifting motion of the pin. The rod 35 constitutes a control means for the clutch.

In the position shown, the gear G is in neutral, that is to say, there is no drive connection between the spindle drive mechanism and the translating gears, the rotation of the gear F simply causing rotation of the gear E (and the idlers I and J). When the spindle drive mechanism is stopped so that the gear E is not rotating, the gear G can be shifted by the rod 35 to one settable position wherein the internal gear H and the gear E are engaged. Under these conditions there is a direct drive between the gear F and the shaft 26. The gears F, E and H have the same number of teeth so that the drive ratio is 1 to 1.

The gear G also can be shifted to another settable position wherein it is engaged with the idler J. Under these conditions, the shaft 26 is driven by the gear F at a slower speed. In this particular instance the reduction is 8:1.

For positively determining the netural and the two settable positions the spring-loaded ball 42 is adapted to engage the detent 43 for the neutral position and to engage the detent 44 for the 8:1 ratio and the detent 45 for the 1:1 ratio.

The fluid motor 17 is interconnected to the pinion D by the clutch 50. The clutch has two parts one part being mounted on the shaft 51 which is driven by the motor and the other part being connected to the shaft 26 mounting the pinion D. The clutch is preferably electrically operated so that when energized shafts 51 and 26 are drivingly engaged and when de-energized the drive connection between the shafts is broken. Thus the clutch is a control means in that it determines when the motor will and will not rotate the pinion.

In order that the spindle drive and the modulated feed motor cannot both supply power to the translating gearing at the same time, interlock means is provided which renders the two drives operatively mutually exclusive. The interlock will be explained in connection with FIGURES 5, 6 and 7.

A lever 52 (on the front of the lathe) controls the motion of the rod 35. The lever is mounted on a swing shaft 53 and it has a spring loaded latch 54 which is adapted to lock within one of the apertures 55, 56 or 57 (see FIG. 7). The aperture 56 defines the neutral position, the aperture 55 defines settable position for 1:1 transmission and the aperture 57 defines the settable position for 8:1 transmission. As shown, the lever is in the neutral position.

Fixed on the swing shaft 53 is an arm 60 which is adapted to rotate in unison with the lever. The arm 60 controls a rod 61 connected to one end of a lever 62 which is pivoted at 63, the other end of the lever 62 is connected to the push rod 35.

The push rod 35 has a cam 64 which is adapted to contact the arm 65 of a switch 66. When the cam 64 contacts the arm 65, the switch 66 closes to energize a circuit for supplying power to the clutch 50 to energize the same. When the lever 52 and cam 64 are in either settable position, the cam 64 does not contact the arm 65 so that the switch 66 is open and cuts off the power to de-energize the clutch 50. The switch 66 constitutes a control means for the clutch 50 and/or motor 17 in that it determines when the motor will or will not drive the pinion. The cam 64 in essence is the interlock in that it is operatively connected between the push rod 35 and switch 66. The circuitry as between the clutch and switch is conventional and need not be described suffice it to say that the switch is in series with the clutch coils or may control a relay, contacts of which are in series with the clutch coils.

From the foregoing description then, it will be apparent that with the control lever 52 in the neutral position drive between the headstock drive mechanism and the translating gears is disconnected and that the clutch 50 drivingly interconnects the modulated feed motor 17 with the pinion D so that rotation of the motor rotates the pinion and hence the translating gears. In either settable position the spindle drive mechanism and the translating gears are connected while the clutch 50 is de-energized to disconnect the motor from the pinion D.

In FIGURES 3 and 4, the fluid motor 17, clutch 50, and pinion D are removed as a unit when the casing 32 is detached from the cover 33. Detaching the cover provides access to the translating gears.

The translating gears are changed as follows:

The quadrant is pivotally connected with the frame (FIGURE 4) with its pivot axis being co-axial with the shaft 26. By shifting the quadrant, the gears B and C can be changed or compounded to vary the speed ratio. The quadrant is held in the desired adjusted position by the locking means 72 operating in the slot 73.

Figure 8:
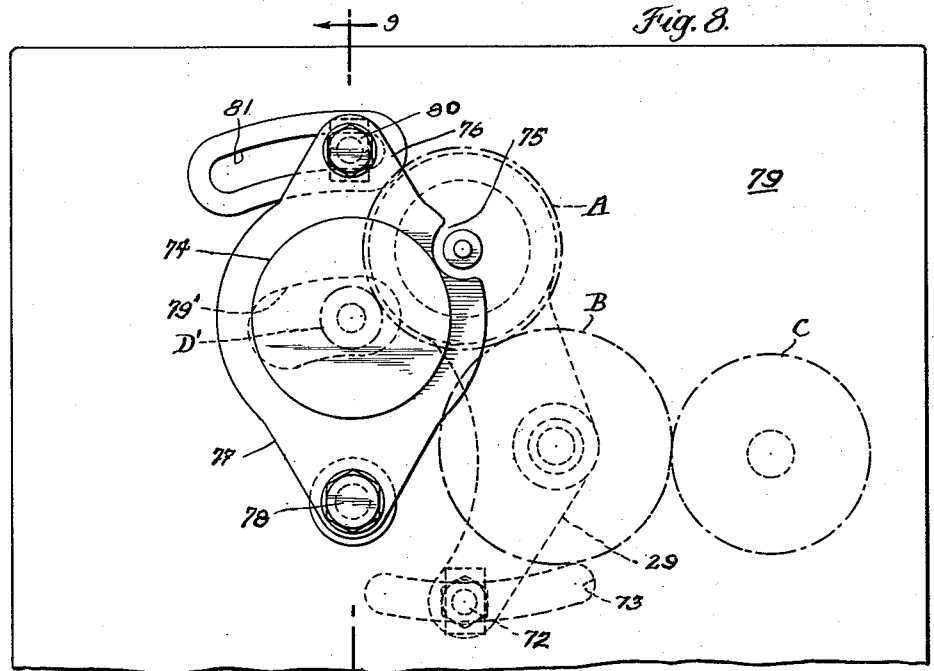
FIGURE 8 is an elevational view illustrating an arrangement mounting the modulated feed motor so that the same can be readily engaged and disengaged with the translating gears of FIGURE 3.
Figures 9, 10:
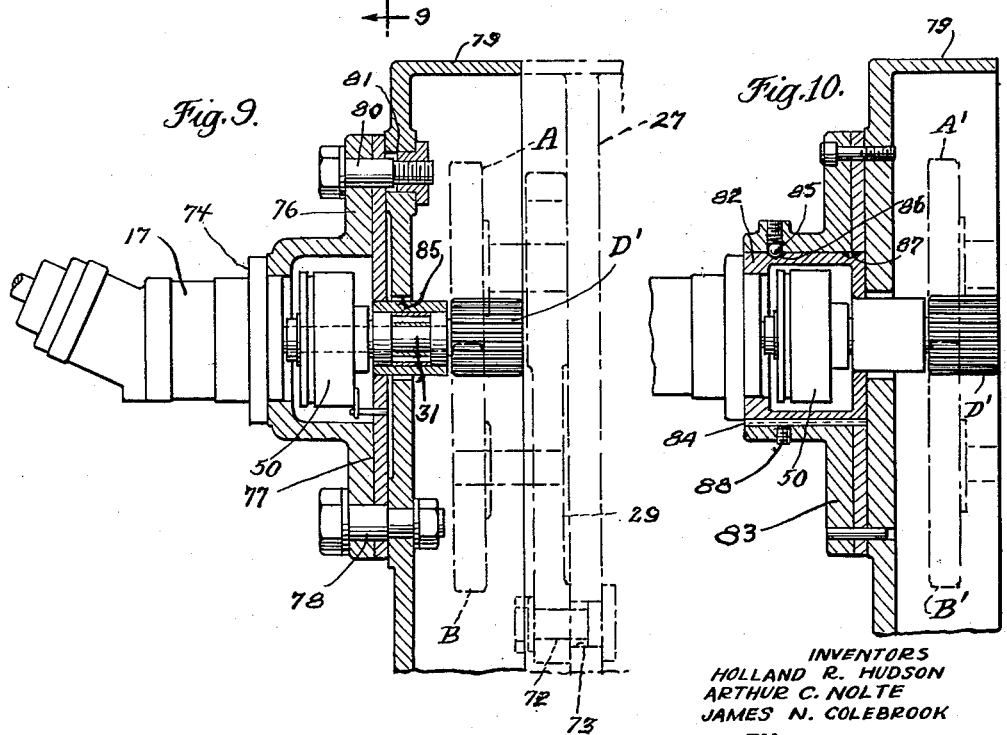
FIGURE 9 is a cross section taken along the line 9—9 of FIGURE 8.
FIGURE 10 is a cross section illustrating another arrangement mounting the modulated feed motor so that the same can be readily engaged and disengaged with the translating gears of FIGURE 3.

In the preferred arrangement the modulated feed motor 17, clutch 50, and pinion D are all mounted on a support so as to be shiftable toward and away from the translating gears. This arrangement has the advantage of permitting not only gears B and C to be changed but also the input translating gear A. The foregoing is shown in FIGURES 8 and 9 where it will be seen that the support or casing 74 is similar to the casing 32 but is modified with cut section 75 and upper and lower ears 76 and 77, the lower ear having pivot connection 78 with the cover 79 and the upper ear having a lock 80 operating in the slot 81. As indicated, the shaft 31 extends through a slot 79' in the cover. The cut out 75 provides clearance for the cam 64. By loosening the lock 80 the motor, etc., can be rotated about the pivot 78. Rotation counterclockwise, of course, disengages the pinion and the input gear. By appropriately adjusting the position of the pinion (and the quadrant 29) several different sizes of the translating gears can be incorporated in the system.

With reference to FIGURE 9, it will be noted that the pinion D' which has the same number of teeth as the pinion D has been increased in axial length. The cover 79 which is similar to cover 33 has been increased in depth so as to provide additional space. The additional space and the increased axial length of the pinion permits greater versatility of change in translating gears.

In FIGURE 10, we have shown another arrangement for moving the fluid motor, clutch and pinion toward and away from the translating gears. In this arrangement the motor 17, clutch 50, and pinion D' are all mounted on a slider 82 which is splined to the casing 83 as by the splines 84. The motor, clutch, and pinion can be pulled outwardly (to the left) until the pinion D' is free from the area occupied by the translating gears. The spring loaded ball 85 cooperating with the detents 86 and 87 determines the inner and outer positions of the slide. A set screw 88 is used to lock the slider in either of the positions.

In FIGURES 11 through 13, we have shown compounding arrangements for use particularly with the embodiment as described in connection with FIGURES 8 and 9. In FIGURE 11, the compounding is such that the speed is reduced as between the input and output of the translating gears.

In FIGURE 11, the casing 4 and the quadrant 29 are adjusted to accommodate the gear L on the shaft 26, the compound gears M and N on the shaft 28 and the gear O on the shaft 30. The gear M meshes with the gear L and the gear O meshes with the gear N. With the pinion D' having 16 teeth; the gear L, 78 teeth; the gear M, 78 teeth; the gear N, 30 teeth; and the gear O, 30 teeth, the speed of gear O is about 1⅓ times that of pinion D'.

In FIGURE 13 the casing 4 and the quadrant 29 are adjusted to accommodate the gear P on the shaft 26, the gears Q and R on the shaft 28 and the gear S on shaft 30. The gear P meshes with gear Q and gear R with the gear S with the pinion D' having 16 teeth; the gear P, 48 teeth; the gear Q, 60 teeth; the gear R, 36 teeth; and the gear S, 72 teeth. The speed of the gear S is about ⅐ of the speed of the pinion D'.

It will be understood, of course, that the compounding as shown in FIGURES 11 and 13 is simply exemplary of the type of arrangements which can be made. For example, the number of teeth on the pinion D' may be changed and different compounding and gear sizes can be used for the translating set.

We claim:
1. In a lathe:
a frame, spindle drive mechanism including an output shaft and carriage feed mechanism to be operated by the spindle drive mechanism, the carriage feed mechanism having translating gears including input and output translating gears and a quick-change gear box connected to the output translating gear;
means on said frame connected between said output shaft and the input translating gear and constituting clutch means which when engaged connects the spindle drive and carriage feed mechanisms, and when disengaged disconnects the same, the clutch means including a drive shaft connected to the input translating gear;
first control means connected with said clutch means to cause operation of the same;
gear means engaged with one of said translating gears by being in mesh therewith;
motor means on said frame connected for rotating said gear means;
second control means connected with said motor and operative to condition the motor to rotate said gear means and to stop rotating said gear means; and
interlock means operatively connected between said first and second control means and providing that when the first control means operates said clutch to cause engagement of the spindle drive and carriage feed mechanisms, said second control means conditions said motor to stop rotating said gear means and further providing that when the first control means operates said clutch to cause disengagement of the spindle drive and carriage feed mechanisms, said second control means conditions said motor for rotating said gear means.
2. In a lathe:
a frame, spindle drive mechanism including an output shaft and carriage feed mechanism to be operated by the spindle drive mechanism, the carriage feed mechanism having translating gears including input and output translating gears and a quick-change gear box connected to the output translating gear;
means on said frame connected between said output shaft and the input translating gear and constituting clutch means which when engaged connects the spindle drive and the carriage feed mechanism and when disengaged disconnects the same, the clutch means including a drive shaft connected to the input translating gear;

first control means connected with said clutch means to cause operation of the same;

a support;

means connecting said support with said frame for movement in a direction toward and away from said translating gears;

gear means to be engaged and disengaged with one of said translating gears, the gear means being rotatably mounted on said support and the movement of the support providing for the engagement and disengagement, when engaged the gear means being in mesh with the translating gear;

motor means on said support and connected for rotating said gear means;

second control means connected with said motor and operative to condition the motor to rotate said gear means and to stop rotating said gear means; and interlock means operatively connected between said first and second control means and providing that when the first control means operates said clutch to cause engagement of the spindle drive and carriage feed mechanisms, said second control means conditions said motor to stop rotating said gear means and further providing that when the first control means operates said clutch to cause disengagement of the spindle drive and carriage feed mechanisms said second control means conditions said motor for rotating said gear means.

3. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting clutch means, which when engaged connects the spindle drive and carriage drive feed mechanisms and when disengaged disconnects the same, the clutch means including a drive shaft connected to the input translating gear;

first control means connected with said clutch means to cause operation of the same;

gear means engaged with said input translating gear by being in mesh therewith;

motor means on said frame connected for rotating said gear means;

second control means connected with said motor and operative to condition the motor to rotate said gear means and to stop rotating said gear means; and interlock means operatively connected between said first and second control means and providing that when the first control means operates said clutch to cause engagement of the spindle drive and carriage feed mechanisms, said second control means conditions the motor to stop rotating said gear means and further providing that when the first control means operates said clutch to cause disengagement of the spindle drive and carriage feed mechanism, said second control means conditions said motor for rotating said gear means.

4. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting clutch means which when engaged connects the spindle drive and carriage feed mechanisms and when disengaged disconnects the same, the clutch means including a drive shaft connected to the input translating gear;

first control means connected with said clutch means to cause operation of the same;

a support;

means connecting said support with said frame for movement in a direction toward and away from said translating gears;

gear means to be engaged and disengaged with said input translating gear, the gear means being rotatably mounted on said support and the movement of the support providing for the engagement and disengagement, when engaged the gear means being in mesh with the translating gear;

motor means mounted on said support and connected for rotating said gear means;

second control means connected with said motor and operative to condition the motor to rotate said gear means and to stop rotating said gear means; and interlock means operatively connected between said first and said second control means providing that when the first control means operates said clutch to cause engagement of the carriage feed and spindle drive mechanisms, said second control means conditions the motor to stop said rotating said gear means and further providing that when the first control means operates said clutch to cause disengagement of the spindle drive and carriage feed mechanism, said second control means conditions said motor for rotating said gear means.

5. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting first clutch means which when engaged connects the spindle drive and the carriage feed mechanisms and when disengaged disconnects the same, the clutch means including a drive shaft connected to the input translating gear;

first control means connected with said first clutch means to cause operation of the same;

gear means engaged with one of said translating gears by being in mesh therewith;

motor means on said frame connected for rotating said gear means;

second clutch means connected with said motor and with said gear means and operative to drivingly engage or disengage the motor and the gear means;

second control means to cause said second clutch to operate; and interlock means operatively connected between said first and second control means and providing that when the first control means operates said first clutch means to cause engagement of the spindle drive and carriage feed mechanism said second control means operates to cause said second clutch means to disengage said motor and gear means and further providing that when the first control means operates said first clutch means to cause disengagement of the spindle drive and carriage feed mechanisms said second control means operates to cause the second clutch means to engage said motor and gear means.

6. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting first clutch means which when engaged connects the spindle drive and carriage feed mechanisms and when disengaged disconnects the same, the clutch means including a drive shaft connected to the input translating gear;

first control means connected with said first clutch means to cause operation of the same;

a support;

means connecting said support with said frame for movement in a direction toward and away from said translating gears;

gear means to be engaged and disengaged with one of said translating gears, the gear means being rotatably mounted on said support and the movement of the support providing for the engagement and disengagement, when engaged the gear means being in mesh with the translating gear;

motor means mounted on said support and connected for rotating said gear means;

second clutch means connected with said motor and with said gear means and operative to drivingly engage and disengage the motor and the gear means;

second control means to cause said second clutch to operate; and interlock means operatively connected between said first and said second control means and providing that when the first control means operates said first clutch means to cause engagement of the spindle drive and carriage mechanisms said second control means operates to cause said second clutch means to disengage said motor and gear means and further providing that when the first control means operates said first clutch means to cause disengagement of the spindle drive and carriage feed mechanisms said second control means operates to cause the second clutch means to engage said motor and gear means.

7. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting first cluch means which when engaged connects the spindle drive and carriage feed mechanisms and when disengaged disconnects the same, the clutch means including a drive shaft connected to the input translating gear;

first control means connected with said first clutch means to cause operation of the same;

gear means engaged with said input translating gear by being in mesh therewith;

motor means mounted on said frame and connected for rotating said gear means;

second clutch means connected with said motor and with said gear means and operative to drivingly engage or disengage the motor and the gear means;

second control means to cause said second clutch means to operate; and interlock means operatively connected between said first and second control means and providing that when the first control means operates said first clutch means to cause engagement of the spindle drive and carriage feed mechanisms said second control means operates to cause said second clutch means to disengage said motor and gear means and further providing that when the first control means operates said first clutch means to cause disengagement of the spindle drive and carriage feed mechanisms said second control means operates to cause the second clutch means to engage said motor and gear means.

8. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting first clutch means which when engaged connects the spindle drive and the carriage feed mechanisms and when disengaged disconnects the same, the clutch means including a drive shaft connected to the input translating gear;

first control means connected with said first clutch means to cause operation of the same;

a support;

means connecting said support with said frame for movement in a direction toward and away from said translating gear;

gear means to be engaged and disengaged with said input translating gear, the gear means being rotatably mounted on said support and movement of the support providing for the engagement and disengagement, when engaged the gear means being in mesh with the translating gear;

motor means mounted on said support and connected for rotating said gear means;

second clutch means connected with said motor and with said gear means and operative to drivingly engage and disengage the motor and the gear means;

second control means to cause said second clutch to operate; and interlock means operatively connected between said first and said second control means and providing that when the first control means operates said first clutch means to cause engagement of the spindle drive and carriage feed mechanisms said second control means operates to cause said second clutch means to disengage said motor and gear means and further providing that when the first control means operates said first clutch means to cause disengagement of the spindle drive and carriage feed mechanisms said second control means operates to cause said second clutch means to engage said motor and gear means.

9. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting first clutch means which when engaged connects the spindle drive and the carriage feed mechanisms and when disengaged disconnects the same, the clutch means including a drive shaft connected to the input translating gear;

first control means connected with said first clutch means to cause operation of the same;

a slide;

means connecting said slide with said frame for reciprocating movement in a direction toward and away from said translating gears;

gear means to be engaged and disengaged with said input translating gear, the gear means being rotatably mounted on said slide and movement of the slide providing for the engagement and disengagement, when engaged the gear means being in mesh with the translating gear;

motor means mounted on said slide and connected for rotating said gear means;

second clutch means connected with said motor and with said gear means and operative to drivingly engage and disengage the motor and the gear means;

second control means to cause said second clutch means to operate; and interlock means operatively connected between said first and said second control means and providing that when the first control means operates said first clutch means to cause engagement of the spindle drive and carriage feed mechanisms said second control means operates to cause said second clutch means to disengage said motor and gear means and further providing that when the first control means operates said first clutch means to cause disengagement of the spindle drive and carriage feed mechanisms said second control means operates to cause said second clutch means to engage said motor and gear means.

10. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

means on said frame connected between said output shaft and the input translating gear and constituting first clutch means which when engaged connects the spindle drive and the carriage feed mechanisms and when disengaged disconnects the same, the clutch means including a drive shaft connected to the input translating gear;

first control means connected with said clutch means to cause operation of the same;

a slide;

means connecting said slide with said frame for reciprocating movement along an arcuate path toward and away from said input translating gear;

gear means to be engaged with said input translating gear, the gear means being rotatably mounted on said slide and the movement of the slide providing for the engagement and disengagement, when engaged the gear means being in mesh with the translating gear;

motor means mounted on said slide and connected for rotating said gear means;

second clutch means connected with said motor and with said gear means and operative to drivingly engage and disengage the motor and the gear means;

second control means to cause said second clutch means to operate; and interlock means operatively connected between said first and said second control means and providing that when the first control means operates first said clutch means to cause engagement of the spindle drive and carriage feed mechanisms said second control means operates to cause second clutch means to disengage said motor and gear means and further providing that when the first control means operates said first clutch means to cause disengagement of the spindle drive and carriage feed mechanisms said second control means operates to cause said second clutch means to engage said motor and gear means.

11. In a lathe:

a frame, spindle drive mechanism including an output shaft and carriage feed mechanism to be operated by the spindle drive mechanism, the carriage feed mechanism having translating gears including input and output translating gears and a quick-change gear box connected to the output translating gear;

clutch means to connect and disconnect the spindle drive and carriage feed mechanism including a hollow drive shaft connected to the input translating gear and further including an external-internal gear mounted on the drive shaft for rotation therewith and for sliding motion back and forth along the shaft axis, a first drive gear mounted on the drive shaft for rotation relative thereo, a pair of compound gears, one of which is meshed with said first drive gear and the other positioned to be meshed with said external gear together with a second drive gear on said output shaft and meshed with said first drive gear;

first control means including a rod extending through said hollow drive shaft and connected to said external-internal gear and means to shift the rod whereby to shift the external-internal gear from a neutral position alternatively to a first settable position wherein the internal gear meshes with the first drive gear and to a second settable position wherein the external gear meshes with said other compound gear;

means connecting said support with said frame for movement in a direction toward and away from the input translating gear;

a pinion to be engaged and disengaged with the input translating gear, the pinion being rotatably mounted on said support and movement of the support providing for the engagement and disengagement, when engaged the gear being meshed with the input translating gear;

a motor mounted on said support;

second clutch means connected between said motor and said pinion and operative to drivingly engage and disengage the motor and the pinion;

second control means including a switch mounted on said frame to cause said second clutch to operate; and interlock means including a cam on said rod and adapted to actuate said switch in the neutral and in the settable positions and providing that when the rod is moved to move the external-internal gear to one of said settable positions, the cam actuates the switch to cause the second clutch means to disengage the motor and the pinion and further providing that when the rod is moved to move the internal-external gear to the neutral position, the cam actuates the switch to cause the second clutch means to engage the motor and pinion.

References Cited in the file of this patent

UNITED STATES PATENTS

| | | |
|---|---|---|
| 2,114,835 | Fouquet | Apr. 19, 1938 |
| 2,228,902 | Allen | Jan. 14, 1941 |
| 2,489,203 | Siekmann et al. | Nov. 22, 1949 |
| 2,629,844 | Eserkaln | Feb. 24, 1953 |
| 2,695,541 | Mobius | Nov. 30, 1954 |
| 2,984,136 | Schuman | May 16, 1961 |

FOREIGN PATENTS

| | | |
|---|---|---|
| 270,097 | Switzerland | Aug. 15, 1950 |

UNITED STATES PATENT OFFICE
CERTIFICATE OF CORRECTION

Patent No. 3,160,040                                            December 8, 1964

Holland R. Hudson et al.

It is hereby certified that error appears in the above numbered patent requiring correction and that the said Letters Patent should read as corrected below.

Column 12, line 14, for "thereo" read -- thereto --; after line 28, insert the following as a new paragraph:

a support;

Signed and sealed this 20th day of April 1965.

(SEAL)
Attest:

ERNEST W. SWIDER                                       EDWARD J. BRENNER
Attesting Officer                                              Commissioner of Patents